United States Patent
Khanna (10) Patent No.: US 10,848,383 B1
(45) Date of Patent: Nov. 24, 2020

(54) SYSTEM, METHOD, AND COMPUTER PROGRAM FOR DYNAMIC ADJUSTMENT OF BANDWIDTH FOR DATA PLANS WITH LIFETIME VALIDITY BASED ON DATA USAGE OF AN END-USER

(71) Applicant: Amdocs Development Limited, Limassol (CY)

(72) Inventor: Nitin Khanna, New Delhi (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 194 days.

(21) Appl. No.: 15/920,326

(22) Filed: Mar. 13, 2018

(51) Int. Cl.
*H04L 12/24* (2006.01)

(52) U.S. Cl.
CPC ........ *H04L 41/0896* (2013.01); *H04L 41/142* (2013.01); *H04L 41/50* (2013.01)

(58) Field of Classification Search
CPC .... H04L 41/0806; H04L 41/142; H04L 41/50
See application file for complete search history.

(56) References Cited

U.S. PATENT DOCUMENTS

| | | | |
|---|---|---|---|
| 8,693,358 B2 * | 4/2014 | Hodges | G06Q 30/00 370/252 |
| 8,964,544 B2 | 2/2015 | Tapia et al. | |
| 9,544,195 B1 * | 1/2017 | Garg | H04L 47/627 |
| 9,557,889 B2 * | 1/2017 | Raleigh | H04M 15/44 |
| 9,736,321 B2 | 8/2017 | Bell et al. | |
| 10,044,879 B1 * | 8/2018 | Oded | H04M 15/42 |
| 10,776,251 B1 * | 9/2020 | Elgarat | G06F 8/70 |
| 2012/0155296 A1 * | 6/2012 | Kashanian | H04M 15/853 370/252 |
| 2012/0250586 A1 * | 10/2012 | Ahmavaara | H04L 67/141 370/259 |
| 2013/0122910 A1 * | 5/2013 | Singh | H04W 36/32 455/437 |
| 2013/0132854 A1 * | 5/2013 | Raleigh | H04W 4/60 715/738 |
| 2013/0275877 A1 * | 10/2013 | Varner | G06F 3/04847 715/736 |
| 2013/0346624 A1 * | 12/2013 | Chervets | H04L 12/1435 709/231 |
| 2015/0237215 A1 * | 8/2015 | Leemet | H04W 4/24 455/405 |

(Continued)

FOREIGN PATENT DOCUMENTS

WO 2004036371 A2 4/2004

*Primary Examiner* — Jerry B Dennison
(74) *Attorney, Agent, or Firm* — Zilka-Kotab, P.C.

(57) ABSTRACT

A system, method, and computer program product are provided for dynamic adjustment of bandwidth for data plans with lifetime validity based on data usage of an end-user. In operation, a system identifies data consumption behavior for a user of a data service corresponding to at least one user device. The data service includes a data usage amount capable of being utilized until fully exhausted. The system calculates an average data usage rate from the data consumption behavior of the user based on data usage in a time period of a previous number of time units. The system determines a new bandwidth for adjustment of the data service, based on the average data usage rate. Moreover, the system dynamically modifies a bandwidth of the data service based on the determined new bandwidth.

13 Claims, 10 Drawing Sheets

(56) References Cited

U.S. PATENT DOCUMENTS

| | | | |
|---|---|---|---|
| 2015/0326461 A1* | 11/2015 | Singh | H04L 43/04 709/221 |
| 2015/0350956 A1* | 12/2015 | Bell | H04M 15/8214 455/405 |
| 2017/0280296 A1 | 9/2017 | Divakaran | |
| 2018/0276689 A1* | 9/2018 | Zhang | G06Q 30/0631 |

* cited by examiner

New QoS/Bandwidth calculation $$\text{New QoS/Bandwidth} = \frac{\text{Data Consumed in last cycle period 'N'}}{\text{'N' time units}}$$

Sample table for computation based on hours (24 hrs in a day)

| Days | \multicolumn{6}{c}{Usage (MB)} | | | | | |
|---|---|---|---|---|---|---|
| | 128 | 256 | 512 | 1024 | 2048 | 4096 | 8192 |
| 1 | 5.33 | 10.67 | 21.33 | 42.67 | 85.33 | 170.67 | 341.33 |
| 2 | 2.67 | 5.33 | 10.67 | 21.33 | 42.67 | 85.33 | 170.67 |
| 3 | 1.78 | 3.56 | 7.11 | 14.22 | 28.44 | 56.89 | 113.78 |
| 4 | 1.33 | 2.67 | 5.33 | 10.67 | 21.33 | 42.67 | 85.33 |
| 5 | 1.07 | 2.13 | 4.27 | 8.53 | 17.07 | 34.13 | 68.27 |
| 6 | 0.89 | 1.78 | 3.56 | 7.11 | 14.22 | 28.44 | 56.89 |
| 7 | 0.76 | 1.52 | 3.05 | 6.10 | 12.19 | 24.38 | 48.76 |
| 8 | 0.67 | 1.33 | 2.67 | 5.33 | 10.67 | 21.33 | 42.67 |
| 9 | 0.59 | 1.19 | 2.37 | 4.74 | 9.48 | 18.96 | 37.93 |
| 10 | 0.53 | 1.07 | 2.13 | 4.27 | 8.53 | 17.07 | 34.13 |
| 11 | 0.48 | 0.97 | 1.94 | 3.88 | 7.76 | 15.52 | 31.03 |
| 12 | 0.44 | 0.89 | 1.78 | 3.56 | 7.11 | 14.22 | 28.44 |
| 13 | 0.41 | 0.82 | 1.64 | 3.28 | 6.56 | 13.13 | 26.26 |
| 14 | 0.38 | 0.76 | 1.52 | 3.05 | 6.10 | 12.19 | 24.38 | e.g. 5.33 Mbps bandwidth if 128 Mb data consumed in last 24 hours (128/24)

e.g. 42.67 Mbps bandwidth if 2048 Mb data consumed in last 48 hours (2048/48)

Sample table for computation based on minutes

| Mins | \multicolumn{3}{c}{Usage (MB)} | | |
|---|---|---|---|
| | 128 | 256 | 512 | 1024 |
| 5 | 25.60 | 51.20 | 102.40 | 204.80 |
| 15 | 8.53 | 17.07 | 34.13 | 68.27 |
| 30 | 4.27 | 8.53 | 17.07 | 34.13 | e.g. 25.60 Mbps bandwidth if 128 Mb data consumed in last 5 minutes (128/5)

e.g. 17.07 Mbps bandwidth if 256 Mb data consumed in last 15 minutes (256/15)

e.g. 8.53 Mbps bandwidth if 256 Mb data consumed in last 30 minutes (256/30)

SYSTEM, METHOD, AND COMPUTER PROGRAM FOR DYNAMIC ADJUSTMENT OF BANDWIDTH FOR DATA PLANS WITH LIFETIME VALIDITY BASED ON DATA USAGE OF AN END-USER

FIELD OF THE INVENTION

The present invention relates to adaptive Quality-of-Service (QoS) for data plans and, more specifically to, a dynamic adjustment of bandwidth for data plans with lifetime validity based on data usage of an end-user.

BACKGROUND

In existing data services, the available data plans provided by Internet service providers (ISPs) have a pre-defined QoS (i.e. a pre-defined data usage quota and a data validity period). The pre-defined QoS and time validity associated with the data plans may be restrictive in providing a flexible and user-friendly data service. Moreover, the limitation in the data plans may result in wastage of end-user resources and network resources if the data is used in an inefficient manner.

There is thus a need for addressing these and/or other issues associated with the prior art.

SUMMARY

A system, method, and computer program product are provided for dynamic adjustment of bandwidth for data plans with lifetime validity based on data usage of an end-user. In operation, a system identifies data consumption behavior for a user of a data service corresponding to at least one user device. The data service includes a data usage amount capable of being utilized until fully exhausted. The system calculates an average data usage rate from the data consumption behavior of the user based on data usage in a time period of a previous number of time units. The system determines a new bandwidth for adjustment of the data service, based on the average data usage rate. Moreover, the system dynamically modifies a bandwidth of the data service based on the determined new bandwidth.

DETAILED DESCRIPTION

Figure 1:
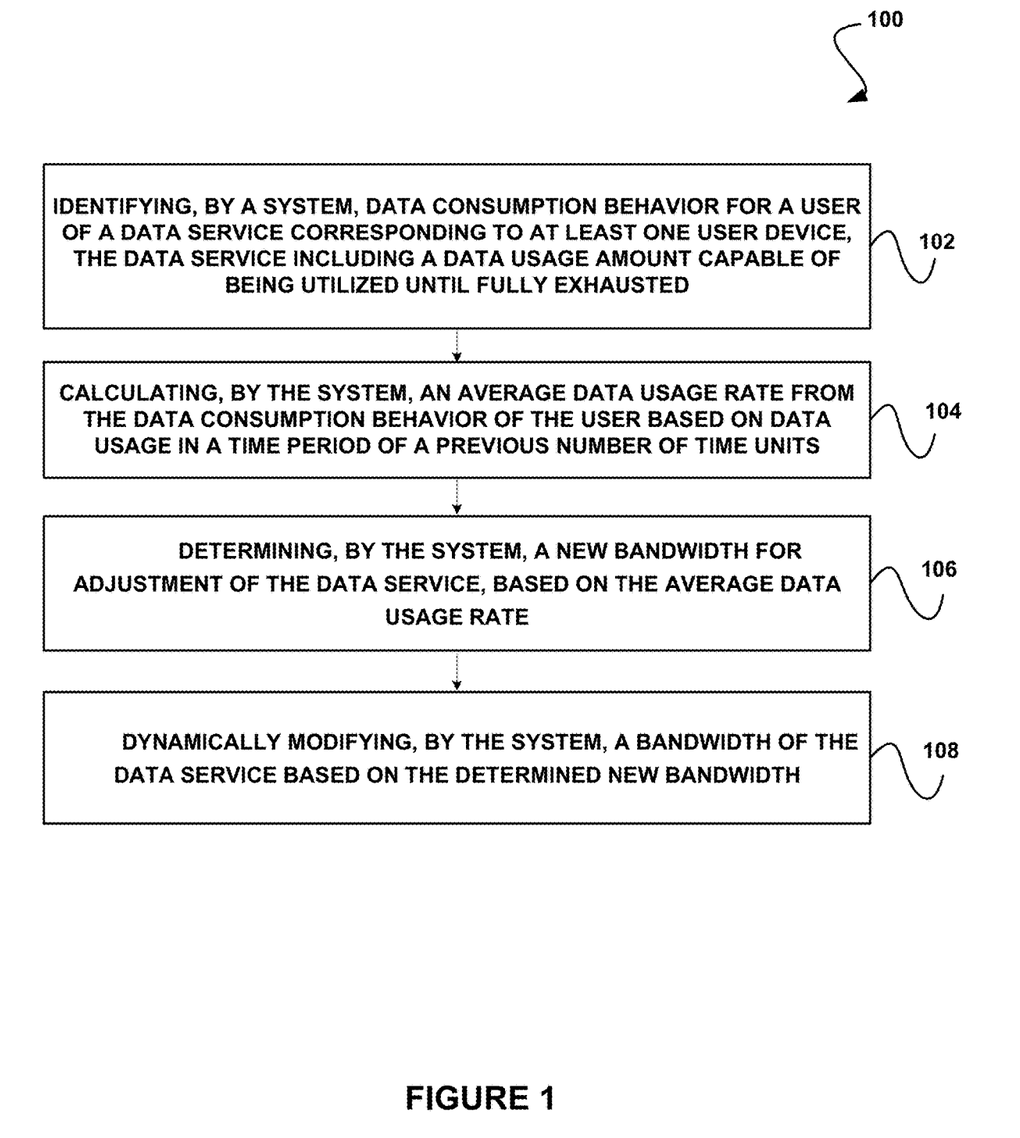
FIG. 1 illustrates a method for dynamic adjustment of bandwidth for data plans with lifetime validity based on data usage of an end-user, in accordance with one embodiment.

FIG. 1 illustrates a method 100 for dynamic adjustment of bandwidth for data plans with lifetime validity based on data usage of an end-user, in accordance with one embodiment.

In operation, a system identifies data consumption behavior for a user of a data service corresponding to at least one user device. See operation 102. The data service includes a data usage amount capable of being utilized until fully exhausted. In other words, the data service may include data with a lifetime validity.

The data service may be associated with various data plans, such as an internet service data plan, etc. The system may include any service provider system and may include various components (e.g. hardware, software, subsystems, etc.). The data consumption behavior may be identified from monitoring, usage logs, and/or utilizing various other techniques. Moreover, the data consumption behavior may include the amount of data used by the user. The user device may include any type of device, such as a mobile phone, computer, etc.

The system calculates an average data usage rate from the data consumption behavior of the user based on data usage in a time period of a previous number of time units. See operation 104. In one embodiment, the previous number of time units may include 'N' number of time units, where 'N' is a positive integer. In various embodiments, the previous number of time units may include one of: one or more hours, one or more days, one or more weeks, or one or more months. In one embodiment, the previous number of time units may be configurable based on preferences of one or more of the user or a service provider of the data service.

The system determines a new bandwidth for adjustment of the data service, based on the average data usage rate. See operation 106. Moreover, the system dynamically modifies a bandwidth of the data service based on the determined new bandwidth. See operation 108. In various embodiments, modifying the bandwidth of the data service based on the determined new bandwidth may include increasing or decreasing the bandwidth of the data service.

In one embodiment, the bandwidth of the data service may modified based on the determined new bandwidth when a current time period equaling the previous number of time units expires. For example, the system may modify the bandwidth after 'N' time units has elapsed.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
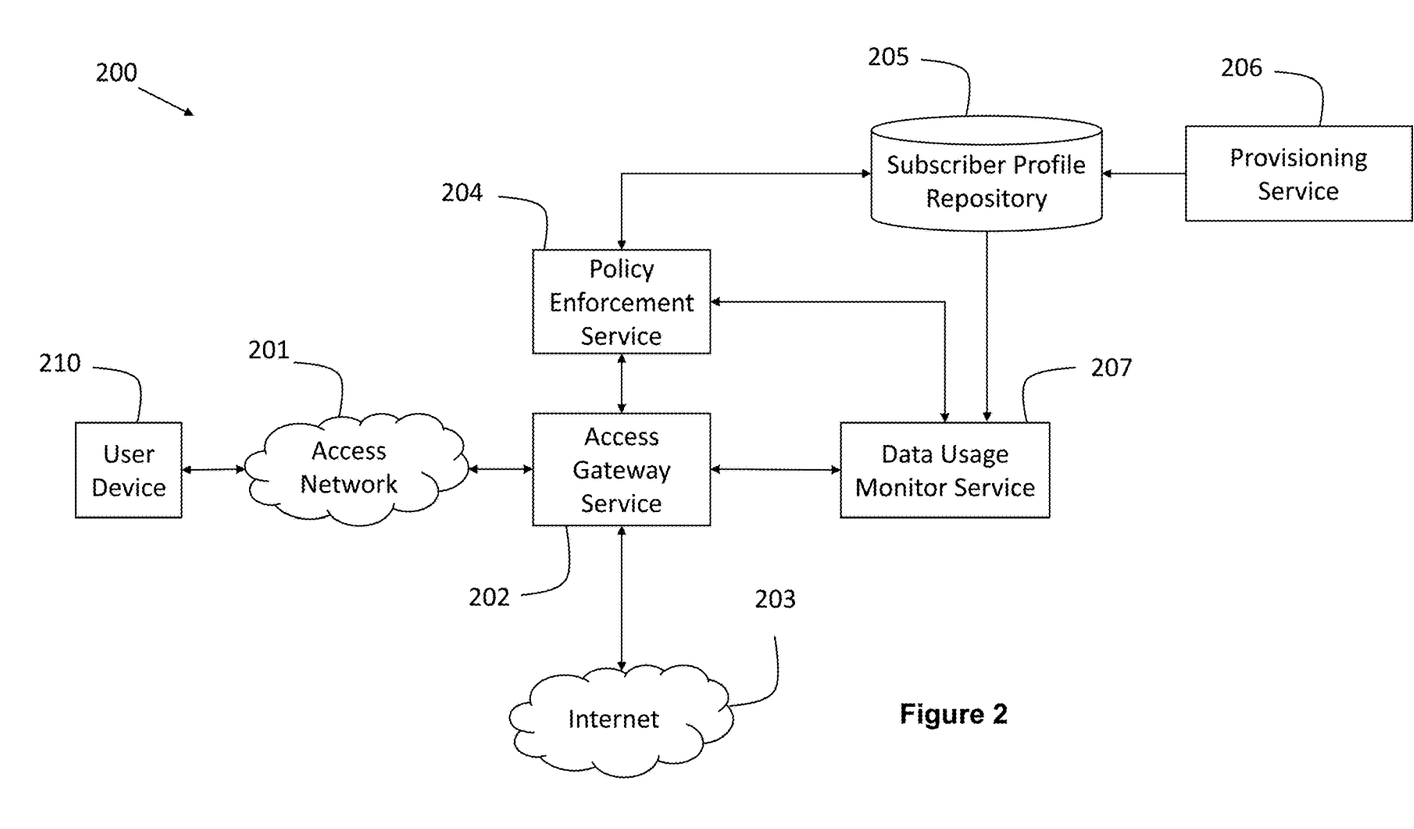
FIG. 2 shows a system for dynamic adjustment of bandwidth for data plans with lifetime validity based on data usage of an end-user, in accordance with one embodiment.

FIG. 2 shows a system 200 for dynamic adjustment of bandwidth for data plans with lifetime validity based on data usage of an end-user, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

In operation, the system 200 may function to provide dynamic adjustment (increase or decrease) of bandwidth of an internet data plan of a subscriber based on an average data consumed in the last 'N' time units by the subscriber.

In existing data services, the available data plans provided by Internet service providers (ISPs) have a pre-defined QoS (i.e. a pre-defined data usage quota and a data validity period). The pre-defined QoS and time validity associated with the data plans may be restrictive in providing a flexible and user-friendly data service. Moreover, the limitation in the data plans may result in wastage of end-user resources and network resources if the data is used in an inefficient manner.

The pre-defined QoS may include bandwidth and the related network resources of the data services. Various example scenarios may help understand problems in the existing data services offered to subscribers.

For example, there may be an end-user with 1 GB data and a one day validity period. This end-user, with 1 GB data for a day, can use the data for different applications. Different applications may consume a varying amount of data, for example, each of chatting, downloading images, videos, and/or the like, may consume or require a different data bandwidth. However, in some cases, the end-user may not be able to use the subscribed data entirely, due to the limited validity period. Additionally, there may be situations such as bad network availability, the end-user being too busy, or the like, that may restrict the end-user from completely using the data available. Such situations of incomplete data usage may cause wastage of the data, thereby resulting in inefficient usage of network resources. The inefficient usage of the network resources may then be a huge loss to both the service providers and the end-users.

As another example, there may be an end-user with 500 MB data and a 28 day validity period. In this scenario, the end-user may face a data shortage associated with a longer usage period, such as the 500 MB data with 28 days validity. In one example case, the end-user may desire to access applications that may consume a huge amount of data such as, watching online videos, online gaming, and/or the like. In such case, the 500 MB data may not be enough and the end-user may not have any alternative other that purchasing more data. The data to be purchased may have different data plans such as 1 GB with one day validity, 2 GB for 28 days, and/or the like. However, the existing data plan of the end-user may lapse due to the new data plan being purchased. In some other cases, the unused data with a longer validity period in the previous data plan may be wasted, if additional unused data is not available. Such scenarios also cause inefficient usage of network resources that affects both the service providers and the end-users.

Based on these examples, it can be understood that internet data services providing data plans with pre-defined data quotas and validity periods restrict efficient usage and management of data and network resources. However, data services with lifetime validity can be provided to the end-users that can allow the end-users to use any amount of data with no upper limit on the bandwidth.

Hence, there is a need to avail user-friendly data services to the end-users, where the data plan provided to the end-user is dynamically updated depending on the actual consumption pattern of the end-user. Such services should preclude wastage of subscribed data, and at the same time be capable of providing benefits to ISPs by facilitating efficient use of network resources.

The system 200 implements methods for an adaptive Quality-of-Service (QoS) for a data plan with lifetime validity based on data usage pattern of the end-user.

The method for adaptive QoS includes calculating the average data usage rate from the data consumption behavior of the end-user. The average data usage rate is calculated based on the data usage in a time period of the last 'N' time units. The average data usage rate then helps in determining the new bandwidth for the adjustment of the corresponding data service by modifying the bandwidth after 'N' time units has elapsed. The new bandwidth is based on the average data consumed in the last 'N' time units, which can either increase or decrease the current bandwidth offered to the end-user. The time units for determining the average data usage rate may be configurable based on preferences of the end-users, the service providers, the business partners, and/or the like.

Various implementations of the system 200 are capable of increasing or decreasing the bandwidth of the end-user connection based on the end-user's data usage consumption behavior. Moreover, the bandwidth may be dynamically adjusted without any intervention of the end-user or the service provider. The method is applicable for different kinds of data services that may include data services such as 2G, 3G, 4G, etc.

The system 200 is a representation of a telecommunication environment including a number of telecommunication devices and gateway computing devices. As shown, the system includes user device 210, access network 201, access gateway service 202, internet communication network 203, policy enforcement service 204, subscriber profile repository 205, provisioning service component 206, and data usage monitor service 207.

The telecommunications-based user device 210 may include a wide variety of devices or components that are capable of initiating, receiving or facilitating communications over a radio communication network. Some of the non-limiting examples for the user device may include personal computing devices, electronic book readers, hand-held computing devices, integrated components for inclusion in computing devices, home electronics, appliances, vehicles, machinery, landline telephones, network-based telephones, or the like. The network-based telephones may include VoIP, cordless telephones, cellular telephones, smart phones, modems, PDA, laptop computers, gaming devices, media devices, and the like.

In an embodiment, the user device may include a wide variety of software and hardware components for establishing communications over one or more communication networks such as wireless communication network, wired communication network and/or the like.

Furthermore, the telecommunication device communication environment can include one or more access gateway services that facilitate or otherwise provide data connectivity to an internet communication network 203. The access gateway services 202 may include a Gateway GPRS Support Node ("GGSN") in accordance with the GPRS and Universal Mobile Telecommunications System (UMTS) air interface standards. In another example, the access gateway service 202 can correspond to the Packet Data Gateway ("PDN") for the Long-Term Evolution (LTE) air interface standards.

The telecommunication device communication environment further includes the policy enforcement service 204 for applying various data or network policies. The policy enforcement service 204 can modify policies associated with subscribers based on data usage of the telecommunications-based user device. Moreover, the policy enforcement service 204 can maintain information regarding current network data policies in the subscriber profile repository 205.

The subscriber profile repository 205 stores and maintains information of the end-users maintained as a profile. It provides the relevant information required for monitoring data usage of the end-users. In one aspect, the subscriber profile repository 205 can be communicated to by a data usage monitor service 207 to download the computation cycle in 'N' time units that has been defined for adaptive QoS algorithm.

The telecommunication device communication environment may include a provisioning service component 206 in communication with the data usage monitor service 207. The provisioning service component 206 may provide an interface to the subscriber profile repository 205 to facilitate the management of subscriber accounts in the event a subscriber has subscribed, modified, or unsubscribed any of the adaptive QoS data plans launched by the telecommunications service provider.

The telecommunication device communication environment includes the data usage monitor service 207 that is in communication with the access gateway services 202. It may be understood that the data usage monitor service 207 may include various components or combination of components implemented by multiple computing devices. Additionally, the functionality associated with the data usage monitor service 207 may be distributed across a communication network, such as a local area network, wide area network or the like.

Furthermore, the data usage monitor service 207 can include various components, sub-components or the like that can be utilized in conjunction with the processing of data use information corresponding to telecommunications-based user devices.

In one aspect, the data usage monitor service 207 can include one or more data use collector components for collecting and processing data use records generated by access gateway services. In another aspect, the data usage monitor service 207 can include an accumulator function for grouping processed data use records over a defined period of time such as a cycle, interval or the like. In a further aspect, the data usage monitor service 207 can include a processing component for keeping track of additions to data usage counter. The data usage monitor service 207 can further include various interfaces for communicating with the access gateway services, telecommunications-based user devices, and other components of the telecommunication device communication environment.

In one embodiment, the steps for the methods for adaptive QoS based on data usage may be based on a high level work flow, including: a first step of feature provisioning; a second step of monitoring data usage; a third step of updating bandwidth after 'N' time; and a fourth step of QoS update notification. These steps are further described with reference to FIGS. 3-6.

Figure 3:
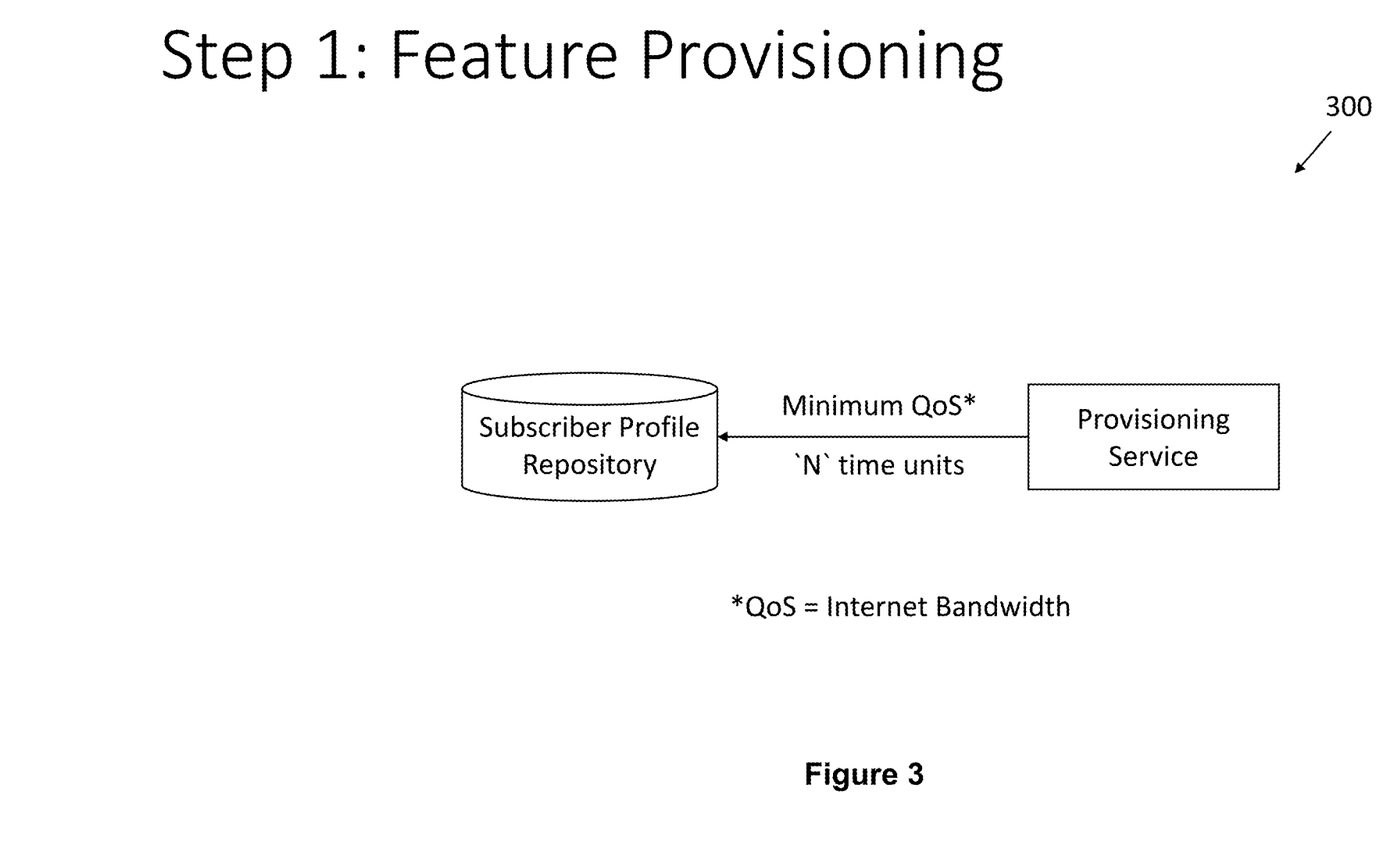
FIG. 3 shows a diagram illustrating a feature provisioning flow for providing an adaptive QoS feature for subscribers from a provisioning service to a subscriber profile repository, in accordance with one embodiment.

FIG. 3 shows a diagram 300 illustrating a feature provisioning flow for providing an adaptive QoS feature for subscribers from a provisioning service to a subscriber profile repository, in accordance with one embodiment. As an option, the diagram 300 may be implemented in the context of the details of the previous figures and/or any subsequent figure(s). Of course, however, the diagram 300 may be implemented in the context of any desired environment. Further, the aforementioned definitions may equally apply to the description below.

As shown, the provisioning service communicates with the data usage monitor service for providing adaptive QoS related data plans based on usage events of the end-users. The events may include subscription, cancelling a subscription, modification to a subscription, or the like.

Figure 4:
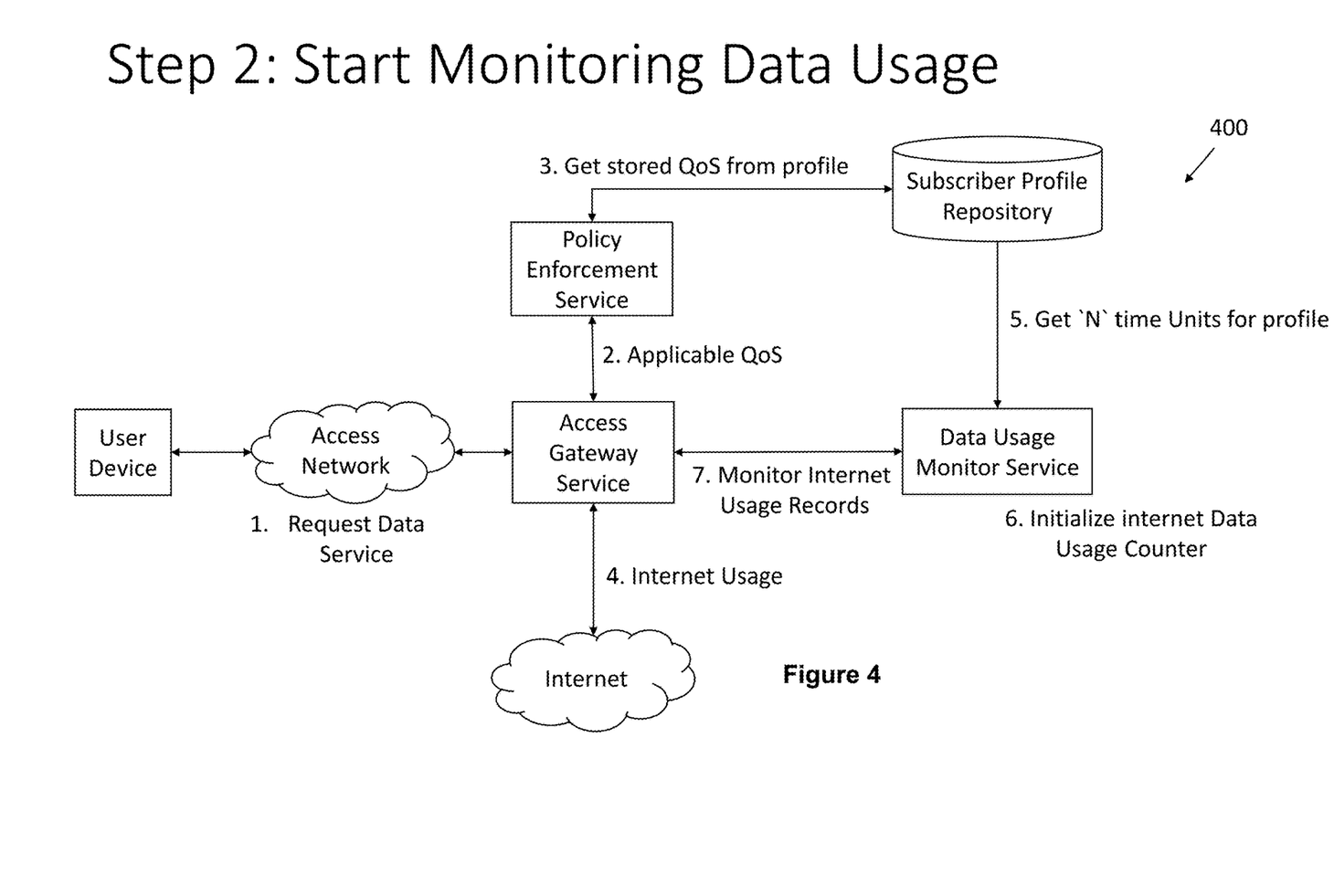
FIG. 4 shows a diagram illustrating a monitoring data usage flow for monitoring data usage of an end-user, in accordance with one embodiment.

FIG. 4 shows a diagram 400 illustrating a monitoring data usage flow for monitoring data usage of an end-user, in accordance with one embodiment. As an option, the diagram 400 may be implemented in the context of the details of the previous figures and/or any subsequent figure(s). Of course, however, the diagram 400 may be implemented in the context of any desired environment. Further, the aforementioned definitions may equally apply to the description below.

The steps involved in monitoring data usage may include: 1) requesting data service; 2) determining an applicable QoS; 3) obtaining stored QoS from a subscriber profile repository; 4) internet usage; 5) obtaining 'N' time units for the corresponding profile of an end-user; 6) initializing internet data usage counter; and 7) monitoring internet usage records.

Figure 5:
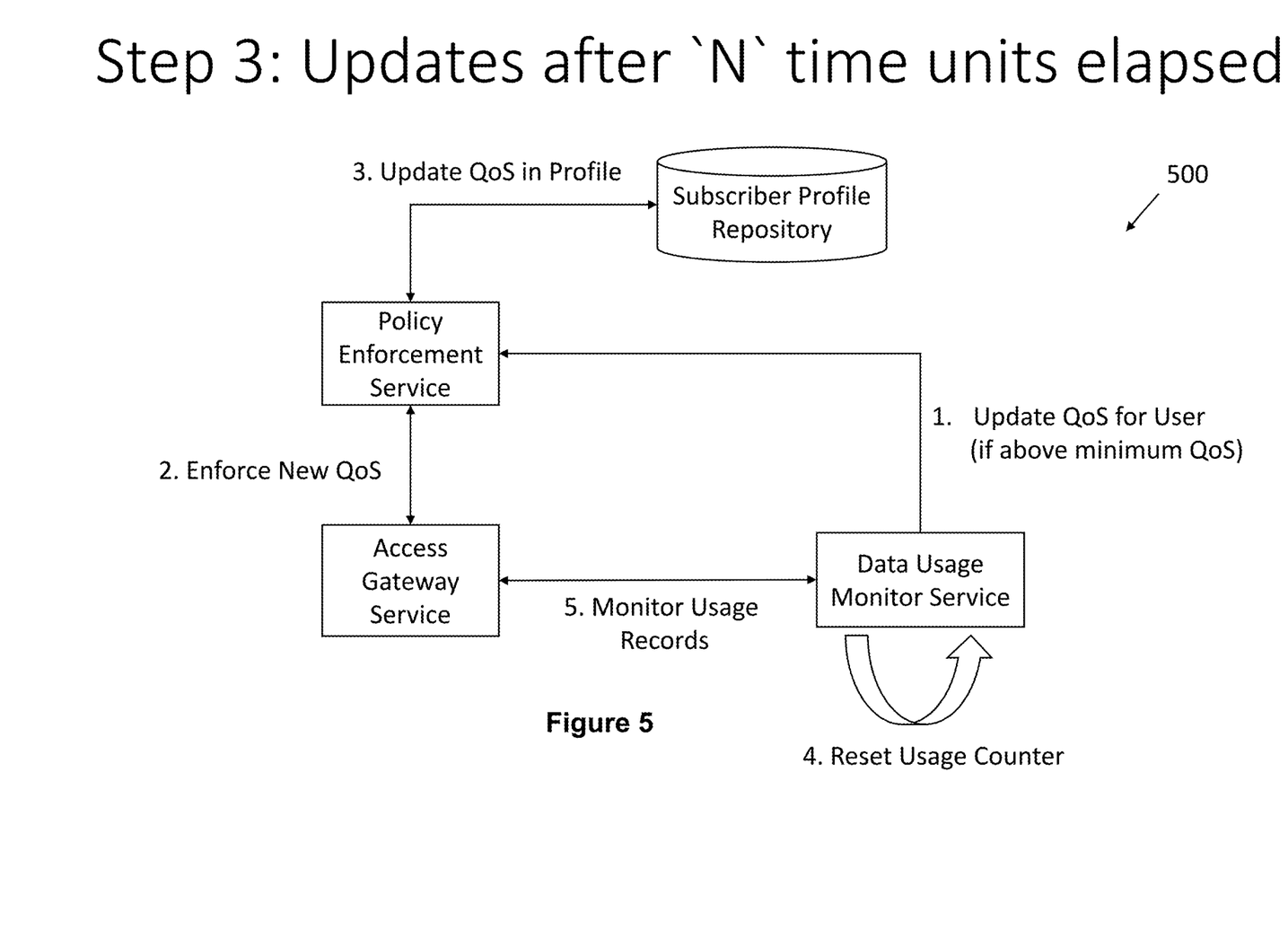
FIG. 5 shows a diagram illustrating a flow for updating QoS based on the data usage of the end-user, in accordance with one embodiment.

In operation, initially, the user device sends a request to establish communication via the wireless communication access network. The request from the user device can correspond to an "Attach Request" transmitted from the user device. Upon receipt of the communication request, the components of the communication access network allocate an access gateway component, such as an access gateway service (as shown in FIG. 5) that is already associated with the user device.

The user device accesses various resources through the internet communication network via the access gateway service. At regular intervals, the access gateway service generates data usage records corresponding to descriptions of the data usage between the user device and the internet communication network. Examples of data usage records include, but are not limited to, Data Call Detail Records ("CDR"), Data Usage Records ("DUR") and/or the like.

Moreover, the data usages records may be transmitted to the data usage monitor service via the access gateway service using a push or pull model. The data usage monitor service then downloads all the subscribers defined in the subscriber profile repository as the adaptive QoS algorithm needs to be executed along with the subscribed cycle-based period defined in the subscriber profile.

The data usage monitor service can process incoming data usage records as they are received to obtain additional information, remove information, modify the measured usage, or the like. In one embodiment, the data usage monitor service can filter out any data usage records related to data that would not be charged for the subscription or considered against the plan, which is often referred to as "whitelist" resources. Furthermore, the data usage monitor service can continue to collect the data records on a per session basis before further processing.

In another embodiment, the data usage monitor service can process each data usage record individually. The data usage monitor service aggregates one or more data usage records over a defined period of time. The defined period of time may be a cycle-based period that is representative of the cumulative data usage of the subscriber. The data usage monitor service then processes the aggregated data usage records to calculate the average data used. The average data used is calculated over the subscribed cycle-based period maintained by the data usage monitor service. Moreover, the cycle based period may correspond to a service plan, subscription plan or the like associated with the subscriber in which cycle based period limits have been defined.

FIG. 5 shows a diagram 500 illustrating a flow for updating QoS based on the data usage of the end-user, in accordance with one embodiment. As an option, the diagram 500 may be implemented in the context of the details of the previous figures and/or any subsequent figure(s). Of course, however, the diagram 500 may be implemented in the context of any desired environment. Further, the aforementioned definitions may equally apply to the description below.

After the elapse of the subscriber cycle period, the data usage monitor service resets the accumulated data usage counter and further determines that if the new calculated average data usage over the cycle period exceeded the minimum guaranteed QoS, the data usage monitor service generates notifications or initiates additional actions.

The steps for updating the QoS after elapse of 'N' time units elapsed includes: 1) updating a QoS for the end-user if the current bandwidth is above the minimum QoS; 2) enforcing the new QoS for the end-user through the policy enforcement service; 3) updating the QoS of the end-user profile in the subscriber profile repository; 4) resetting the usage counter through the data usage monitor service; and 5) monitoring the usage records after the update of the QoS.

Figure 6:
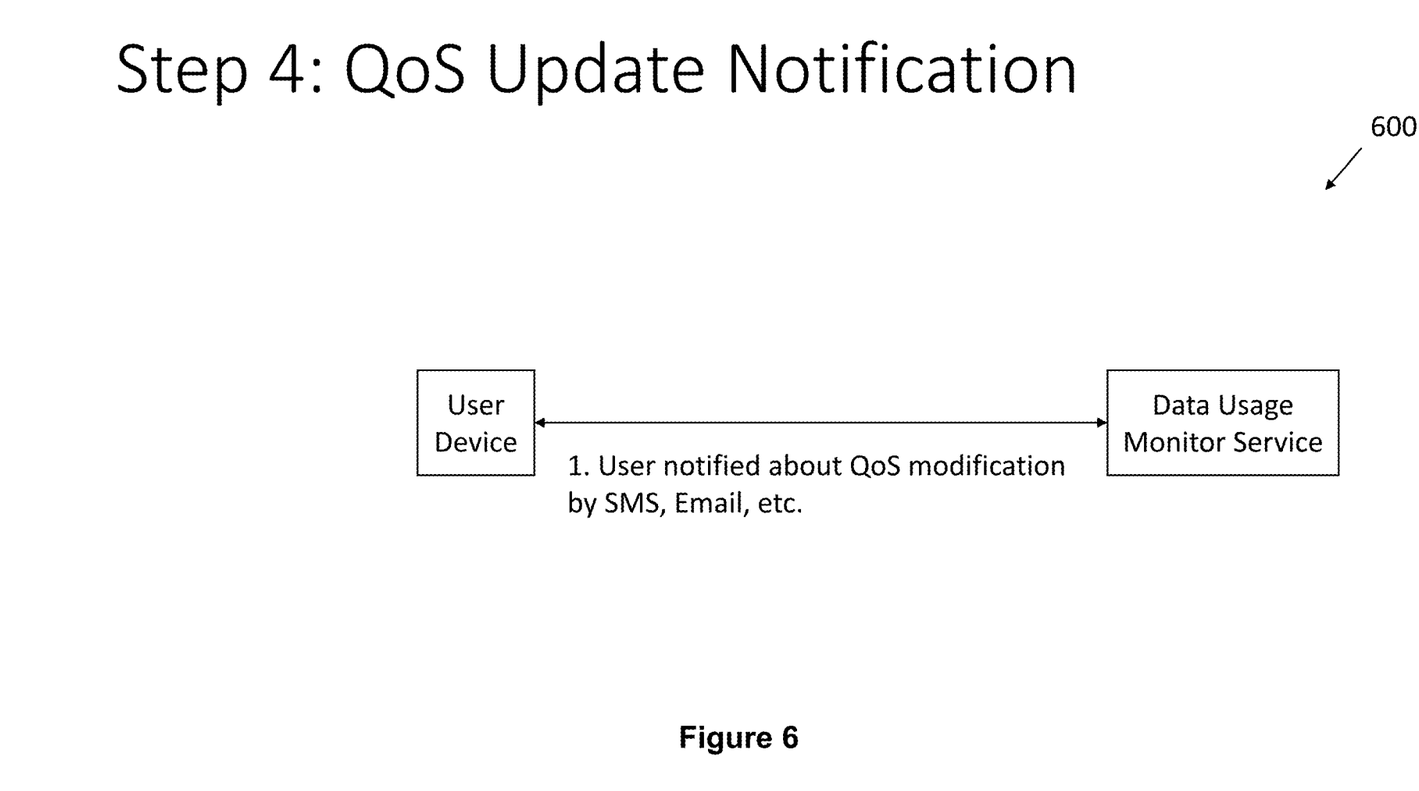
FIG. 6 shows a diagram illustrating a flow for providing a notification to an end-user about the updated QoS/bandwidth, in accordance with one embodiment.

FIG. 6 shows a diagram 600 illustrating a flow for providing a notification to an end-user about the updated QoS/bandwidth, in accordance with one embodiment. As an option, the diagram 600 may be implemented in the context of the details of the previous figures and/or any subsequent figure(s). Of course, however, the diagram 600 may be implemented in the context of any desired environment. Further, the aforementioned definitions may equally apply to the description below.

In operation, the data usage monitor service can transmit a notification to, or otherwise initiate, the policy enforcement service to modify the data access policy associated with the subscriber. For example, the policy enforcement service may update a configuration to the access gateway service to increase or decrease the data bandwidth made available to the user device. The policy enforcement service can then access the current subscriber profile repository that was used to establish the current communication context and modify the data policy to reflect the new updated QoS/bandwidth.

In one embodiment, the data usage monitor service may transmit one or more notifications to the user device to inform the subscriber about the updated QoS or the bandwidth. In one example embodiment, the data usage monitor service may generate notifications such as an SMS message, an e-mail message, or the like that is transmitted to the user device.

Figure 7:
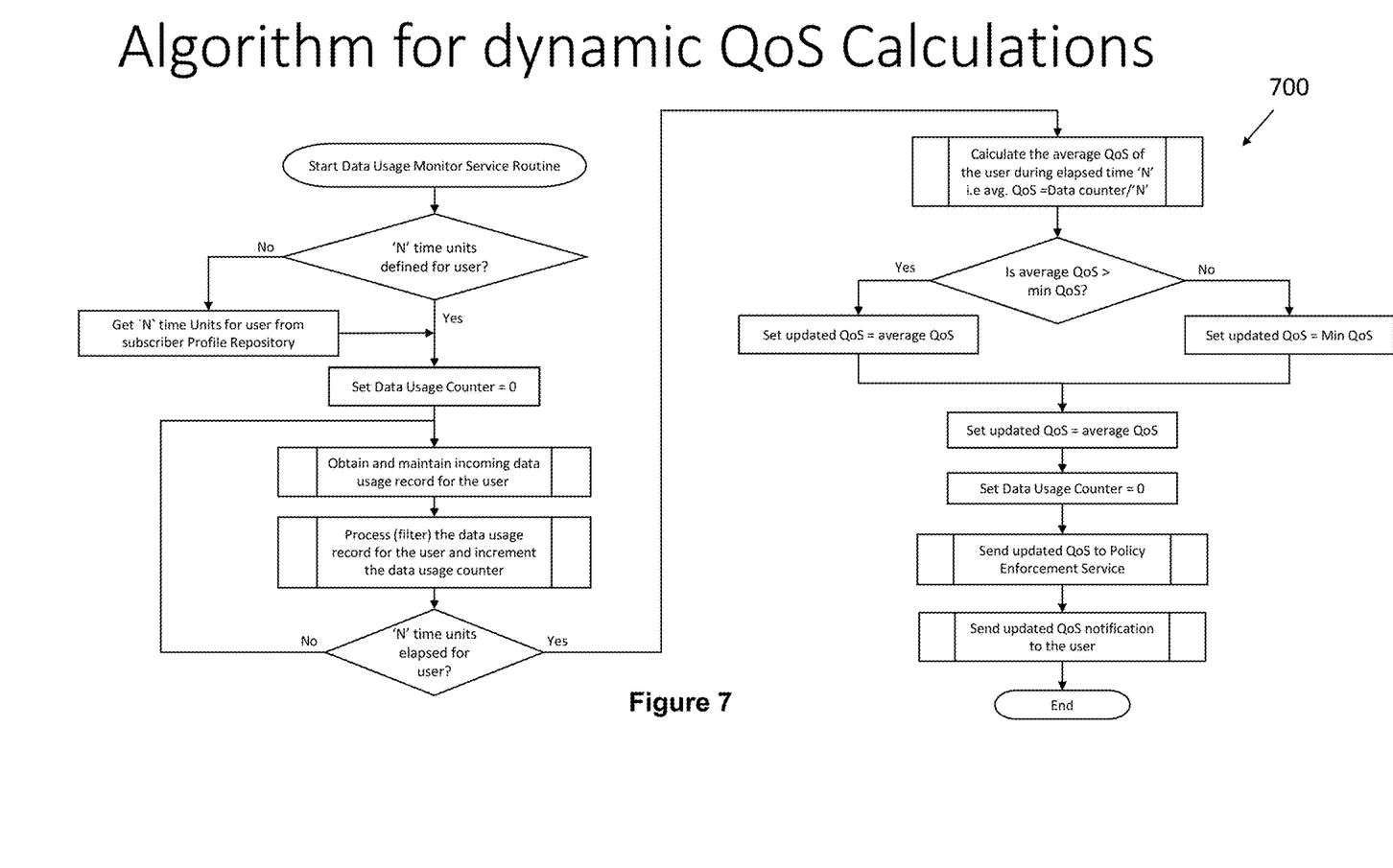
FIG. 7 shows a diagram illustrating a process for an adaptive QoS of a data plan, in accordance with one embodiment.

FIG. 7 shows a diagram 700 illustrating a process for an adaptive QoS of a data plan, in accordance with one embodiment. As an option, the diagram 700 may be implemented in the context of the details of the previous figures and/or any subsequent figure(s). Of course, however, the diagram 700 may be implemented in the context of any desired environment. Further, the aforementioned definitions may equally apply to the description below.

As shown, a data usage monitor service routine is started by the system. The system determines whether 'N' time units are defined for an associated user. If the time units have not been defined for the user, 'N' time units are obtained from a subscriber profile repository. The system then sets the data usage counter to zero. The system obtains and maintains incoming data usage records for the user.

Further, the system processes the data usage record for the user and increments the data usage counter. The system then determines whether 'N' time units have elapsed for the user. If they have, the system calculates the average QoS of the user during the elapsed time 'N'. The system then determines whether the average QoS is greater than a minimum required QoS. If it is, the system sets the updated QoS to equal the average QoS. If it is not, the system sets the updated QoS to the minimum QoS. The system then sets the data usage counter to zero. The system sends the updated QoS to a policy enforcement service and sends the updated QoS notification to the user.

Figure 8:
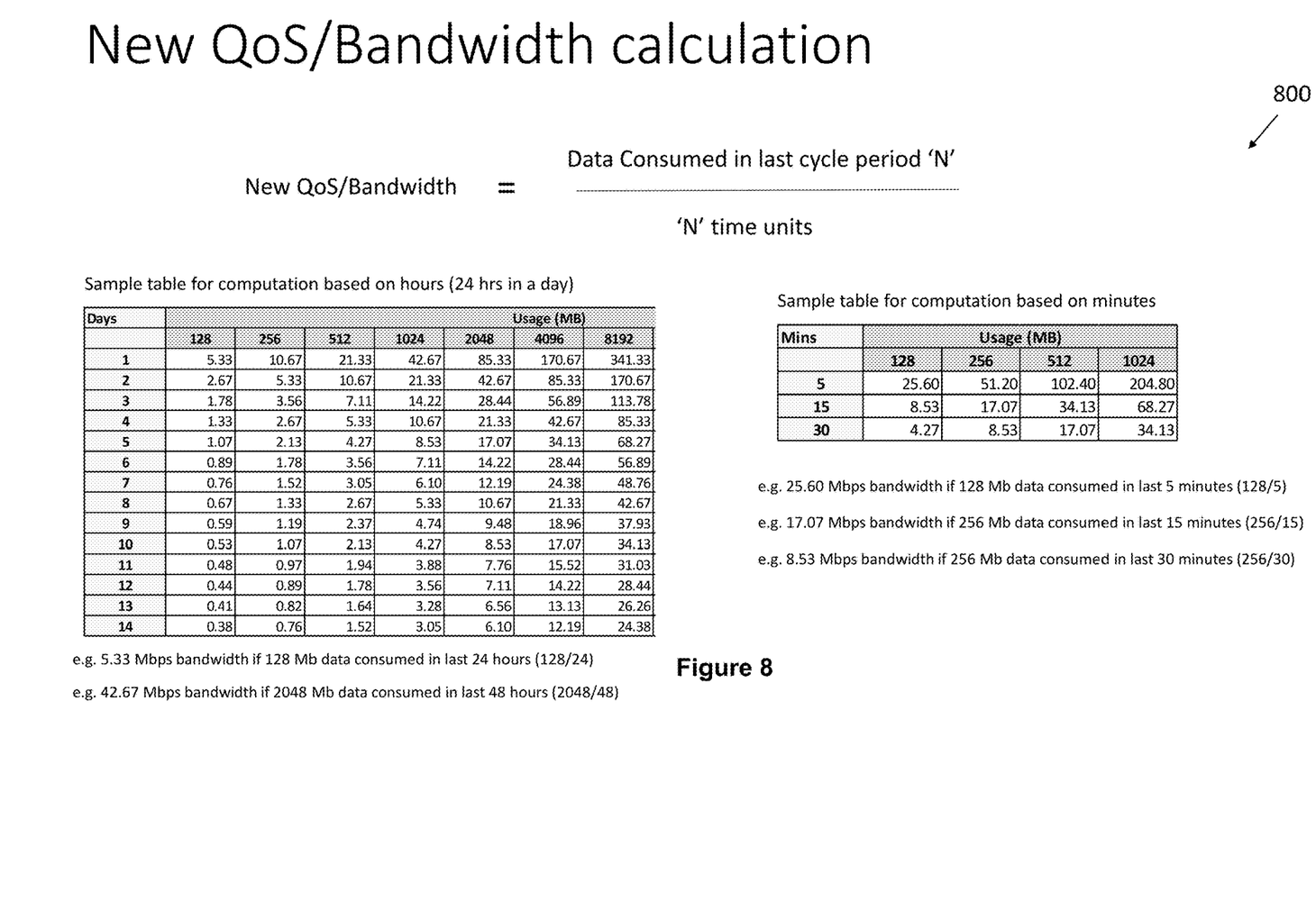
FIG. 8 shows a diagram illustrating an equation and tables associated with a new QoS/bandwidth calculation, in accordance with one embodiment.

FIG. 8 shows a diagram 800 illustrating an equation and tables associated with a new QoS/bandwidth calculation, in accordance with one embodiment. As an option, the diagram 800 may be implemented in the context of the details of the previous figures and/or any subsequent figure(s). Of course, however, the diagram 800 may be implemented in the context of any desired environment. Further, the aforementioned definitions may equally apply to the description below.

In one embodiment, the calculation for a new QoS/bandwidth for dynamic bandwidth adjustment may be based on the equation shown in FIG. 8.

As an example use case utilizing the system and methods described herein, the end-user can access a data service with lifetime validity that may have a zero data usage quota with minimum bandwidth in the beginning (based on the national regulations). The data services can be initiated by purchasing data with some data usage quota. Once the end-user has consumed the entire data usage quota, the data services are no longer available, and the user needs to buy another data usage quota.

When the end-user is using the available data of the purchased data usage quota, the bandwidth of the data services will be modified after 'N' time units has elapsed. The new bandwidth updated is based on the average data consumed in the last 'N' time units. The update may result in either an increase or decrease in the bandwidth of the user connection based on the usage pattern of the end-user.

The 'N' time units can be decided by the service provider and offered as data packages. The end-user may subscribe to a specific package offered by the service provider. In one embodiment, there may be an upper limit defined for the available bandwidth due to physical/technical limitations.

Moreover, the service provider may be benefited with a higher Average Revenue per User (ARPU) for the end-users that consume a large amount of data. Additionally, the service providers may not need to reserve specific bandwidth for low data end-users, which helps in saving network resources from any resource wastage.

In some other cases, a booster plan can be purchased additionally by the end-user to start the data services with a higher bandwidth anytime. One example scenario is when the end-user bandwidth reaches a minimum bandwidth (such as 512 kbps, etc.) as per the average data usage calculation. In such scenario, if the end-user has to download a big file, such as movie files, then a booster plan can be purchased.

The booster plan may be for Rs 10 that can provide 100 mbps line for the next 24 hrs. At this point, the provisioning system may update the subscriber profile repository with a bandwidth of 100 mbps and the policy enforcer may increase the user speed from 512 kbps to 100 mbps immediately, through the validity of the booster plan (i.e. the next 24 hours). After 24 hours, the end-user bandwidth may be calculated as per the old adaptive average data usage algorithm.

The first table shown in FIG. 8 shows a sample of a data plan matrix that can be used by the service provider for different packages based on different time units such as hours, minutes, and/or the like. In this example, computation is based on hours.

Using the equation shown in FIG. 8, the bandwidth may be updated using the new bandwidth value. For example, for data usage of 128 MB in one day, the bandwidth can be adjusted based on the following calculation: New bandwidth=128/24=5.33.

Similarly, the same calculation can be carried out for different data usage consumed on a daily basis. Moreover, the same calculation can be carried out for data usage consumed on a minute basis. The second table shown in FIG. 8 provides computation of new bandwidth based on minutes.

For example, the new bandwidth that has to be adjusted for 128 MB data consumed in the last 5 minutes may be calculated as follows: New bandwidth=128/5=25.60. Likewise, the bandwidth can be adjusted for different data consumed in the last 15 minutes, 30 minutes, or the like.

Figure 9:
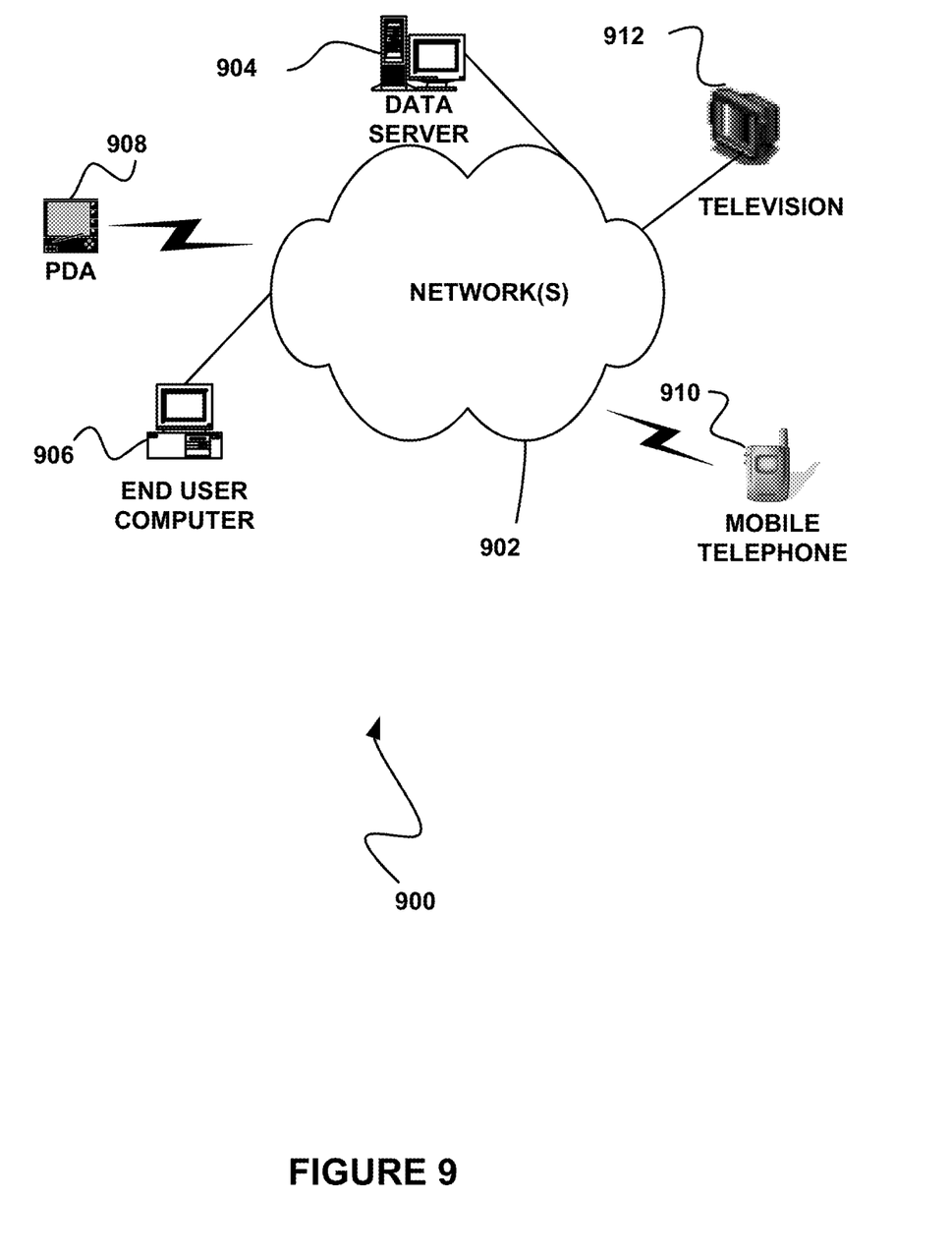
FIG. 9 illustrates a network architecture, in accordance with one possible embodiment.

FIG. 9 illustrates a network architecture 900, in accordance with one possible embodiment. As shown, at least one network 902 is provided. In the context of the present network architecture 900, the network 902 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 902 may be provided.

Coupled to the network 902 is a plurality of devices. For example, a server computer 904 and an end-user computer 906 may be coupled to the network 902 for communication purposes. Such end-user computer 906 may include a desktop computer, lap-top computer, and/or any other type of logic. Still yet, various other devices may be coupled to the network 902 including a personal digital assistant (PDA) device 908, a mobile phone device 910, a television 912, etc.

Figure 10:
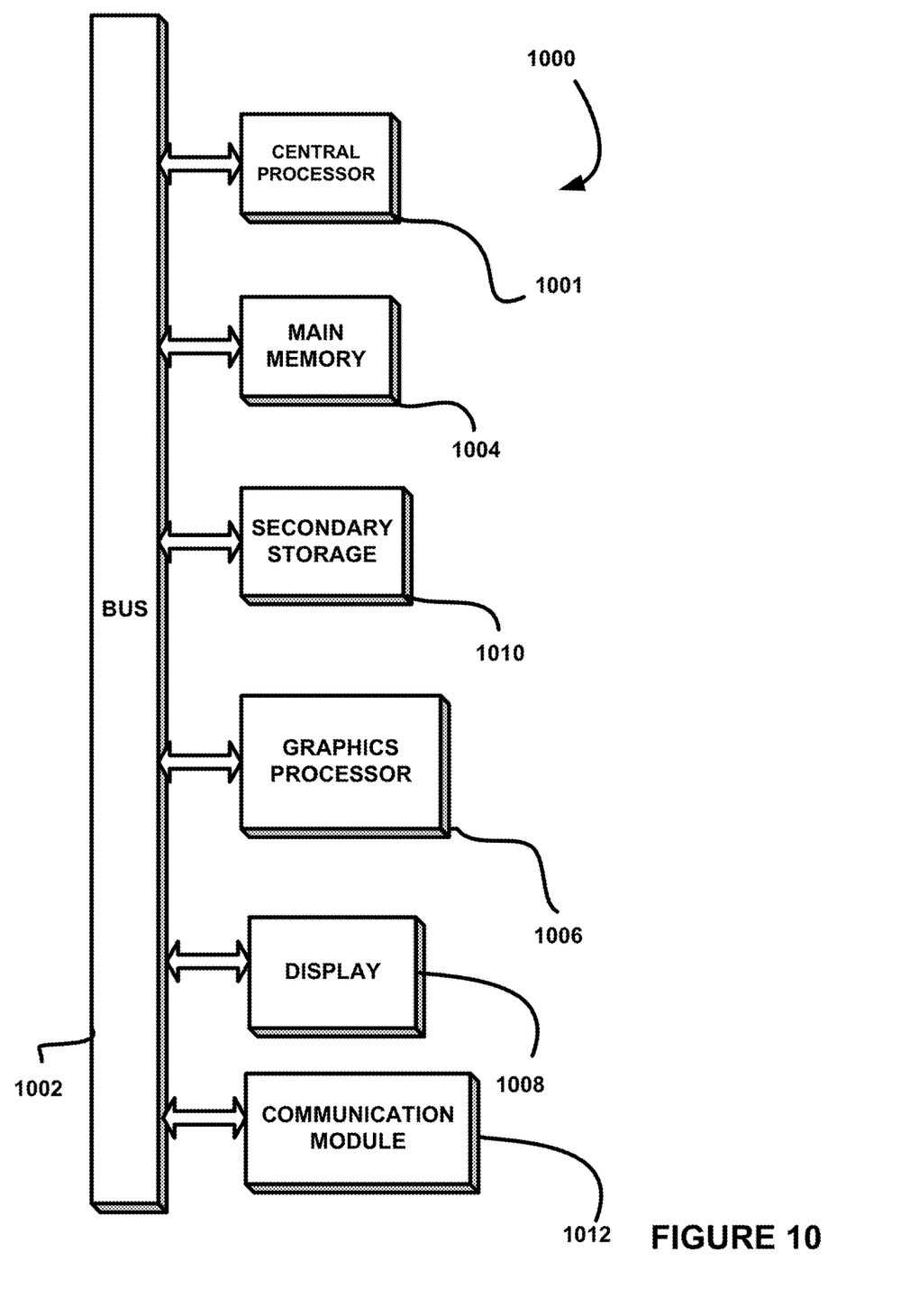
FIG. 10 illustrates an exemplary system, in accordance with one embodiment.

FIG. 10 illustrates an exemplary system 1000, in accordance with one embodiment. As an option, the system 1000 may be implemented in the context of any of the devices of the network architecture 900 of FIG. 9. Of course, the system 1000 may be implemented in any desired environment.

As shown, a system 1000 is provided including at least one central processor 1001 which is connected to a communication bus 1002. The system 1000 also includes main memory 1004 [e.g. random access memory (RAM), etc.]. The system 1000 also includes a graphics processor 1006 and a display 1008.

The system 1000 may also include a secondary storage 1010. The secondary storage 1010 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1004, the secondary storage 1010, and/or any other memory, for that matter. Such computer programs, when executed, enable the system 1000 to perform various functions (as set forth above, for example). Memory 1004, storage 1010 and/or any other storage are possible examples of non-transitory computer-readable media.

The system 1000 may also include one or more communication modules 1012. The communication module 1012 may be operable to facilitate communication between the system 1000 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    identifying, by a system, data consumption behavior for a user of a data service corresponding to at least one user device, the user having a cycle-based subscription to the data service and the cycle-based subscription defining a particular data usage amount capable of being utilized until fully exhausted over a particular period of time;
    calculating, by the system, an average data usage rate from the data consumption behavior of the user,
        wherein the average data usage rate is calculated based on data usage by the user over an N number of time units,
        wherein the N number of time units is configurable based on preferences of one or more of the user or a service provider of the data service,
        wherein the average data usage rate is calculated when the N number of time units have elapsed within the particular period of time;
    determining, by the system, a new data usage amount capable of being utilized until fully exhausted over a new period of time, based on the average data usage rate;
    dynamically modifying, by the system, the cycle-based subscription of the user to define the new data usage amount as capable of being utilized until fully exhausted over the new period of time; and
    sending, by the system, the modified cycle-based subscription to a policy enforcement service.

2. The method of claim 1, wherein the new data usage amount is greater than the particular data usage amount.

3. The method of claim 1, wherein the new data usage amount is less than the particular data usage amount.

4. The method of claim 1, wherein the N number of time units includes one of: one or more hours, one or more days, one or more weeks, or one or more months.

5. The method of claim 1, wherein the data service includes an internet service.

6. A computer program product embodied on a non-transitory computer readable medium, comprising computer code for:
    identifying, by a system, data consumption behavior for a user of a data service corresponding to at least one user device, the user having a cycle-based subscription to the data service and the cycle-based subscription defining a particular data usage amount capable of being utilized until fully exhausted over a particular period of time;
    calculating, by the system, an average data usage rate from the data consumption behavior of the user,
        wherein the average data usage rate is calculated based on data usage by the user over an N number of time units,
        wherein the N number of time units is configurable based on preferences of one or more of the user or a service provider of the data service, wherein the average data usage rate is calculated when the N number of time units have elapsed within the particular period of time;

determining, by the system, a new data usage amount capable of being utilized until fully exhausted over a new period of time, based on the average data usage rate;

dynamically modifying, by the system, the cycle-based subscription of the user to define the new data usage amount as capable of being utilized until fully exhausted over the new period of time; and sending, by the system, the modified cycle-based subscription to a policy enforcement service.

7. The computer program product of claim 6, wherein the new data usage amount is greater than the particular data usage amount.

8. The computer program product of claim 6, wherein the new data usage amount is less than the particular data usage amount.

9. The computer program product of claim 6, wherein the N number of time units includes one of: one or more hours, one or more days, one or more weeks, or one or more months.

10. The computer program product of claim 6, wherein the data service includes an internet service.

11. A system, comprising one or more processors, operable for:

identifying, by the system, data consumption behavior for a user of a data service corresponding to at least one user device, the user having a cycle-based subscription to the data service and the cycle-based subscription defining a particular data usage amount capable of being utilized until fully exhausted over a particular period of time;

calculating, by the system, an average data usage rate from the data consumption behavior of the user, wherein the average data usage rate is calculated based on data usage by the user over an N number of time units, wherein the N number of time units is configurable based on preferences of one or more of the user or a service provider of the data service, wherein the average data usage rate is calculated when the N number of time units have elapsed within the particular period of time;

determining, by the system, a new data usage amount capable of being utilized until fully exhausted over a new period of time, based on the average data usage rate;

dynamically modifying, by the system, the cycle-based subscription of the user to define the new data usage amount as capable of being utilized until fully exhausted over the new period of time; and sending, by the system, the modified cycle-based subscription to a policy enforcement service.

12. The method of claim 1, wherein the system identifies the data consumption behavior from data usage records, and wherein the data usage records are filtered to remove records related to data that is not chargeable against the cycle-based subscription of the user.

13. The method of claim 1, wherein the new data usage amount over the new period of time is defined as an average data usage amount when the average data usage amount exceeds the particular data usage amount over the particular period of time.

* * * * *